Sept. 8, 1936.  E. W. WORK  2,053,931
PRESSURE CONTROL VALVE
Filed Nov. 3, 1934
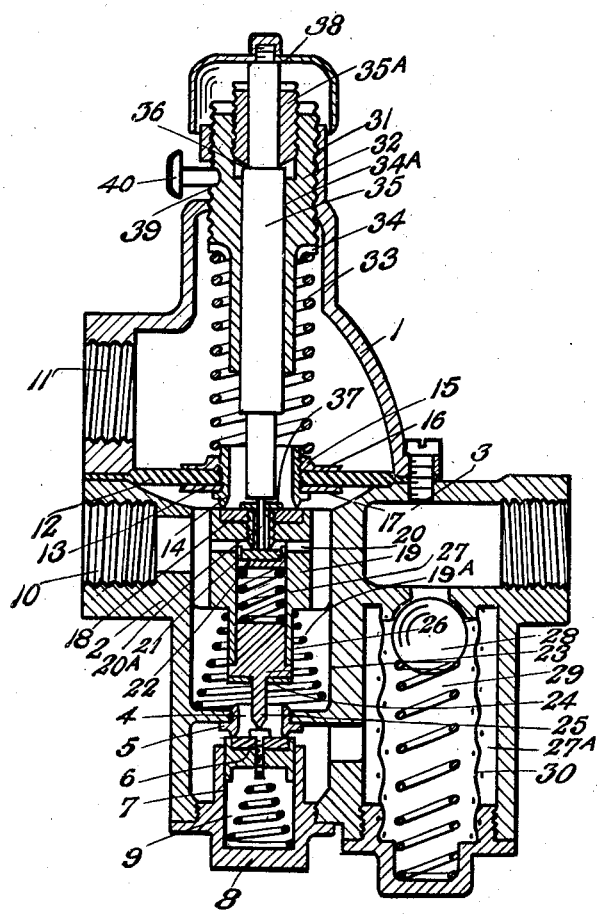
INVENTOR
ERNEST WILLY WORK
by
ATTORNEY Patented Sept. 8, 1936

2,053,931

UNITED STATES PATENT OFFICE 2,053,931

PRESSURE CONTROL VALVE

Ernest Willy Work, Toronto, Ontario, Canada, assignor to Patent Development Company Limited, Toronto, Ontario, Canada, a corporation of Ontario, Canada Application November 3, 1934, Serial No. 751,313

7 Claims. (Cl. 50—23)

This invention relates to a pressure control mechanism for maintaining the pressure in a water pressure system within maximum and minimum predetermined limits constructed in such a manner that it will have a greater degree of safety in operation than has been present in devices heretofore made for similar purposes. The object of the invention being to provide a control valve which will be simple in construction, positive in its action and will eliminate the danger of the adhesion of the valve disc to the valve seat, due to the corrosion of the valve disc to its seat particularly after a period of inactivity during which the whole force of the spring presses the valve disc against its seat.

A further feature of my invention is the provision of a valve for the inlet port which is normally maintained open but closed upon removal of the inlet valve to prevent the escape of fluid through the inlet port from within the system. This feature permits of the cleaning of the inlet port without the necessity of draining the whole system.

Another feature of my invention is the provision of means for adjusting, within predetermined limits, the pressure at which the inlet valve will open without disturbing the adjustment of the relief valve. This means is very conveniently employed in the initial filling of the system.

Other and further objects of my invention will be apparent from the following description and the accompanying drawing wherein I describe and show a preferred embodiment of my invention, it being understood that many modifications may be made therein without in any way departing from the spirit of my invention.

The drawing shows a sectional elevation of the device.

Like characters of reference refer to like parts throughout the specification and drawing.

The control valve illustrated in the drawing comprises a hollow body consisting of a hollow head 1 and a hollow main body portion 2 threadably connected together. The main body portion is provided with an inlet channel 3 adapted for connection to a supply of water under pressure, an inlet port 4 communicating between the inlet channel and the interior of the main body portion 2, a valve seat 5 on the said port and an inlet valve disc 6 therefor. The valve disc is slidably mounted in a tubular casing 7 formed in and extending upwardly from the removable cap 8 which closes the bottom of the main body 2 and is supported on a spring 9 which prevents it from falling away from the seat when opened, the valve disc 6, in the present construction being maintained closed by the initial pressure within the supply line. The main body portion is also provided with an outlet port 10 adapted for communication with the system, a discharge port 11 and on the discharge side of the main body, with a relief valve structure consisting of a flexible diaphragm 12, responsive to pressure variations within the body, an orifice 13 through the diaphragm in axial alignment with the inlet port 4, a valve seat 14 mounted on the diaphragm and having an exteriorly threaded tubular extension 15 projecting through the orifice into the main body portion, the valve seat being removably attached to the diaphragm by means of the discs 16 and 17, one threaded onto the extension 15 below the diaphragm and the other threaded thereon above the diaphragm.

Normally engaging with the valve seat 14 is a valve disc 18 which is slidably mounted in a member 19, the member 19 being mounted within the main body 2 in such a manner that it will move with the movement of the diaphragm in response to pressure variations within the system thereby maintaining the valve disc 18 seated throughout this movement, this being accomplished by resiliently supporting the member 19 on a spring member 19a. The member 19 is formed with a horizontal passageway 20 which communicates with a vertical passageway 20a extending through the valve disc 18 so that there is a clear passageway from the main body of the valve through the tubular extension 15 to the outlet 11. The vertical passageway 20a is provided at its lower end with a valve seat 21 which is normally closed by a valve disc 22 slidably mounted within the member 19 and normally maintained closed by the pressure within the system. Slidably mounted in the lower end of the member 19 is a member 23 which carries a valve disc 24, the member 23 also carrying a downwardly projecting stem 25 which engages with the inlet valve 6 to open it when the pressure within the system falls below a predetermined maximum. The member 25 is designed so as to remain stationary during the movement of the member 19 in response to pressure variations within the minimum and maximum predetermined limits but when the pressure falls below the minimum pressure for which the valve is set the shoulder 26 will be engaged by the member 19 which forces the member 23 down to open the inlet valve disc 6. The valve 21 is resiliently supported on a spring 27 which acts against it and the member 24. The inlet passageway has a portion thereof formed into a well 27a in which is mounted a check valve 28 which closes the passageway against a reverse flow of fluid in the passageway, the check valve being supported on a spring 29, the check valve and the spring being enclosed by a screen 30.

The head 1 is provided with an interiorly threaded bore 31 which is coaxial with the extension 15 and into this bore is threadedly entered a compression screw 32. A compression spring 33 is located within the head and abuts against a shoulder 34a on the compression screw and the disc 16 on the diaphragm, the compression spring acting to resist the movement of the diaphragm under the force of the pressure within the system. The compression screw is provided with a central bore 34 into which is slidably entered a movable stop 35, the vertical movement of the stop being arrested by an adjustable screw 35a which is threadedly entered into the compression screw 32 and adapted to engage with the shoulder 36 on the stop when the pressure within the system has reached a predetermined maximum. The lower end of the stop is formed with a projection 37 which is entered in the passageway 20a. The movable stop projects through the screw 35a and is surmounted by a cap 38.

The adjustment of the pressure at which the inlet valve will open is regulated by the pressure of the spring 33 acting on the diaphragm, the pressure of this spring being regulated and controlled by the compression screw 32. In initially filling the system it is advantageous in order to obtain a very quick filling to increase the pressure at which the valve will open and I accomplish this by forming a slot 39 in the side of the head having a pitch substantially the same as the pitch of the thread on the compression screw 32 and then entering into the screw 32 through the slot 39, a pin 40 by means of which the pressure of the spring 33 may be temporarily increased and then returned to its original setting. The pressure at which either the valve disc 22 or the valve disc 18 will be unseated is regulated by the distance of travel of the stop 35 which distance of travel is regulated by the screw 35a. To give a decrease in pressure within the system the screw 35a is advanced towards the diaphragm and to give an increase in pressure it is retarded. It will be observed that by providing two relief valve discs that, should the valve disc 22 fail to be unseated by the stop 35, the stop then would act to unseat the valve disc 18. I have found in actual practice that by having a ratio of 1 to 450 between the valve disc and the diaphragm that a greater factor of safety is present due to the force which would be acting to separate this disc from its seat.

By providing the member 23 and having mounted thereon a valve disc 24 it will be noticed that when the cap 8 is removed the member 23 will drop down closing the inlet port 4 against the escape of fluid therethrough from within the system thus permitting of the repair of the inlet valve disc or cleaning the dirt that may be therearound without draining the whole system to perform this necessity.

Having thus fully described my invention what I claim as new and desire to secure by Letters Patent is:

1. A control mechanism for maintaining the pressure in a fluid pressure system within maximum and minimum predetermined limits, comprising a hollow body having an inlet port for connection with a supply line, an outlet port for connection with a fluid pressure system and also having a discharge port, a valve cooperating with the inlet port and normally maintained closed, excess pressure relief means interposed between the outlet and discharge ports including a reciprocable member within the body movable in response to pressure variations in the system, a valve seat carried by said member, a valve cooperating with said seat and normally maintained closed and movable with said member to remain seated during predetermined travel of said member, a passageway through said second mentioned valve, a valve seat carried by said second mentioned valve, a valve cooperating with said last mentioned seat and normally maintained closed and movable with said second mentioned valve to remain seated during predetermined travel of said valve, stop means engageable by said third named valve for successively unseating the same and the second mentioned valve when the pressure within the system exceeds a predetermined maximum, means engaging said valves for unseating the inlet valve when the pressure within the system falls below a predetermined minimum pressure and a valve carried by said means closing the inlet port against the escape of fluid therethrough from within the system when the inlet valve is removed.

2. A control mechanism for maintaining the pressure in a fluid pressure system within maximum and minimum predetermined limits, comprising a hollow body having an inlet port for connection with a supply line, an outlet port for connection with a fluid pressure system, and also having a discharge port, a valve cooperating with the inlet port normally maintained closed, excess pressure relief means interposed between the outlet and discharge ports including a reciprocable member within the body movable in response to pressure variations in the system, means engaging said member for resisting movement thereof toward the discharge port, a valve seat carried by said member, a valve cooperating with said seat normally maintained closed to remain seated during predetermined travel of said member, a passageway through said second mentioned valve, a valve seat carried by said second mentioned valve, a valve cooperating with said last mentioned seat and normally maintained closed and movable with said second mentioned valve to remain seated during predetermined travel of said valve, means engaging said valves for unseating said inlet valve when said member moves in response to a decrease in the pressure of the system below the minimum limit for unseating the inlet valve, means engageable by said third named valve for successively unseating the same and the second mentioned valve when the member moves in response to excess pressure within the system, and means for selectively adjusting said second and fourth named means for regulating the pressure point at which said second and third named valves will open.

3. A control mechanism for maintaining the pressure in a fluid pressure system within maximum and minimum predetermined limits, comprising a hollow body having an inlet port for connection with a supply line, an outlet port for connection with a fluid pressure system, and also having a discharge port, a valve cooperating with the inlet port normally maintained closed, excess pressure relief means interposed between the outlet and discharge ports including a reciprocable member within the body movable in response to pressure variations in the system, means engaging said member for resisting movement thereof toward the discharge port, a valve seat carried by said member, a valve cooperating with said seat normally maintained closed to remain seated during predetermined travel of said member, means engaging said valves for unseating said inlet valve when said member moves in response to a decrease in the pressure of the system below the minimum limit for unseating the inlet valve, means engageable by said second named valve for unseating the same when the member moves in response to excess pressure within the system, means for selectively adjusting said second and fourth named means for regulating the pressure point at which said second valve will open, and a valve carried by said means closing the inlet port against the escape of fluid therethrough from within the system when the inlet valve is removed.

4. In a pressure control mechanism comprising a hollow body having inlet, outlet and discharge ports, a valve for the inlet port, a pressure relief mechanism for the discharge port comprising a reciprocable member movable in response to pressure variations within the body, said member having a passage therethrough, and a valve normally closing said passage, a passageway through said second mentioned valve, a valve seat carried by said second mentioned valve, a valve cooperating with said last mentioned seat and normally maintained closed and movable with said second mentioned valve to remain seated during predetermined travel of said valve, means extending longitudinally of the body and extending exteriorly thereof adapted to be manually operated for successively unseating the first and last mentioned valves.

5. In a pressure control mechanism comprising a hollow body having inlet, outlet and discharge ports, a valve for the inlet port, a pressure relief mechanism for the discharge port comprising a reciprocable member movable in response to pressure variations within the body, said member having a passage therethrough, and a valve normally closing said passage, a passageway through said second mentioned valve, a valve seat carried by said second mentioned valve, a valve cooperating with said last mentioned seat and normally maintained closed and movable with said second mentioned valve to remain seated during predetermined travel of said valve, means extending longitudinally of the body and extending exteriorly thereof adapted to be manually operated for successively unseating the first and last mentioned valves, and a valve closing the inlet port against the escape of fluid therethrough from within the system when the inlet valve is removed.

6. A control valve means of the character described comprising a body having inlet, outlet and discharge ports, fluid pressure operated inlet and relief valve means for controlling flow of fluid from the inlet to the outlet ports and from the outlet to the discharge ports, respectively, means for successively opening and closing each of said valves as the pressure within the system rises above or falls below predetermined maximum and minimum pressures respectively and means for varying, within predetermined limits the pressure at which the inlet valve will open and close without affecting the setting of the relief pressure.

7. In a pressure control mechanism comprising a hollow body having an inlet, outlet and discharge ports, a valve for the inlet port, a pressure relief mechanism for the discharge port, comprising a reciprocable member movable in response to pressure variations within the body, said member having a passage therethrough, and a valve normally closing said passage, means extending longitudinally of the body and extending exteriorly thereof adapted to be manually operated for successively unseating the first and last mentioned valves, and a valve closing the inlet port against the escape of fluid therethrough from within the system when the inlet valve is removed.

ERNEST WILLY WORK.